US011468896B2

(12) United States Patent
Mondragon (10) Patent No.: US 11,468,896 B2
(45) Date of Patent: Oct. 11, 2022

(54) SYSTEMS, METHODS, AND APPARATUS FOR REAL-TIME DICTATION AND TRANSCRIPTION WITH MULTIPLE REMOTE ENDPOINTS

(71) Applicant: nVoq Incorporated, Boulder, CO (US)

(72) Inventor: David Mondragon, Boulder, CO (US)

(73) Assignee: nVoq Incorporated, Boulder, CO (US)

( * ) Notice: Subject to any disclaimer, the term of this patent is extended or adjusted under 35 U.S.C. 154(b) by 0 days.

(21) Appl. No.: 16/896,836

(22) Filed: Jun. 9, 2020

(65) Prior Publication Data

US 2020/0395020 A1    Dec. 17, 2020

Related U.S. Application Data

(60) Provisional application No. 62/967,316, filed on Jan. 29, 2020, provisional application No. 62/860,372, filed on Jun. 12, 2019.

(51) Int. Cl.
*G10L 15/26* (2006.01)
*H04W 4/12* (2009.01)

(52) U.S. Cl.
CPC .............. *G10L 15/26* (2013.01); *H04W 4/12* (2013.01)

(58) Field of Classification Search
None
See application file for complete search history.

(56) References Cited

U.S. PATENT DOCUMENTS

| 8,989,713 | B2 * | 3/2015 | Doulton ................ H04M 3/533 455/414.1 |
| 9,667,773 | B2 * | 5/2017 | Kawa ..................... G06F 3/0484 |
| 2011/0035355 | A1 | 2/2011 | Sagar et al. |
| 2012/0166192 | A1 | 6/2012 | Yanagihara |
| 2012/0265805 | A1 | 10/2012 | Samdadiya et al. |
| 2013/0110509 | A1 | 5/2013 | Cath et al. |
| 2013/0339858 | A1 | 12/2013 | Corfield |
| 2014/0122359 | A1 * | 5/2014 | Rao ....................... G06Q 10/105 705/321 |
| 2014/0327599 | A1 | 11/2014 | Abu Awad |
| 2016/0111082 | A1 | 4/2016 | Molloy et al. |
| 2017/0142094 | A1 | 5/2017 | Doitch et al. |

OTHER PUBLICATIONS

International Search Report and Written Opinion dated Sep. 9, 2020 for International Application No. PCT/US2020/037216.
Kurihara et al., "Speech pen: Predictive handwriting based on ambient multimodal recognition," Conference: Proceedings of the 2006 Conference on Human Factors in Computing Systems, CHI 2006, Montréal, Québec, Canada, Apr. 22-27, 2006.

* cited by examiner

*Primary Examiner* — Quynh H Nguyen
(74) *Attorney, Agent, or Firm* — Perkins Coie LLP (57) ABSTRACT

A method to allow for real-time dictation and transcription with multiple remote endpoints is provided. The method comprises evoking a primary application and a client device APP (or APP) to work with a remote hosted application to process audio for the primary application. The APP connects to the hosted application, and the hosted application receives and processes the audio. The hosted application returns the text to the client device, which text populates the primary application. The APP and/or the hosted application also transmits the text to a remote endpoint, such as, for example, a desktop computer or a laptop computer where the user can interact with the primary application and the text returned by the hosted application.

20 Claims, 11 Drawing Sheets

SYSTEMS, METHODS, AND APPARATUS FOR REAL-TIME DICTATION AND TRANSCRIPTION WITH MULTIPLE REMOTE ENDPOINTS

CROSS-REFERENCE TO RELATED APPLICATION(S)

This application claims priority to U.S. Provisional Application No. 62/860,372, filed Jun. 12, 2019, and U.S. Provisional Application No. 62/967,316, filed Jan. 29, 2020, the entire contents of which are incorporated herein by reference.

BACKGROUND

Computing devices have existed for many years in a variety of form factors. The computing devices may be smartphones, tablets, notebooks, desktops, laptops, or the like. Applications that process the audio from the computing device (or the client device), such as speech to text data processing, have been co-resident with the local computer. In each case, the computing device and application interact directly with the user to process the audio to text.

A speech to text data processing application running on a computing device is one type of application that may receive input from, for example, a microphone connected directly to the computing device. For example, the speech to text data processing may generate a text file, such as a word document, similar to this patent application. Other examples include using the speech to text data processing to enter data into an editable field, such as by placing a cursor in a database field, a user interface field, an electronic health record, or the like.

Figure 1:
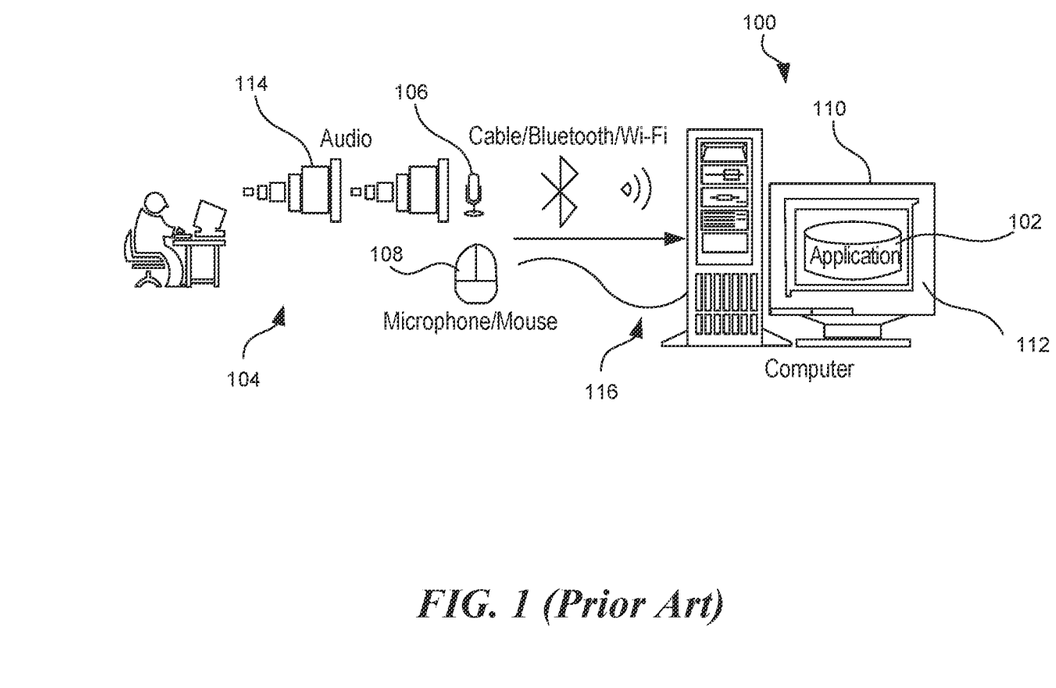
FIG. 1 is a functional block diagram of a thick client having an audio input to a local application on a local processor.

FIG. 1 shows a conventional thick client computing device 100 (sometimes referred to simply as thick client 100 or computing device 100) where an application 102 is running on the computing device 100 that is directly or locally coupled to an input 104, such as, for example, a microphone 106, mouse 108, or keyboard (where the keyboard is not specifically shown). Notice the input 104 could include a number of other devices such as for example, an optical pen, a touch screen, or the like as are generally known in the art. The conventional thick client 100 also has a monitor 110 that may display an interface or text document to accept and display the data input through the input 104 or a processed version of the data input through the input 104. As can be appreciated, the thick client 100 and the application 102 running on the thick client 100, which may provide a display 112 on the monitor 110, receives audio 114 from a user that is transmitted directly to the application 102 via the microphone 106. If the application 102 is, for example, a dictation application, the audio 114 could be converted by the application 102 running on the thick client 100 into text that would be displayed on display 112 in a Microsoft Word document, a text or editable field, etc. Thus, the user speaks into the microphone 106 that transmits the audio 114 to the thick client 100 via a cable or wireless network connection 116. The application 102 running on the thick client 100 receives the audio 114 and performs some operation and the results (optionally) are displayed on the display 112, which could be a computer screen or monitor, a print out, a sound out, or the like. Essentially, as is generally understood by the terminology of a thick client, the microphone, application, and various computer components are all co-resident in one computing environment regardless of how the peripherals, such as the microphone 106 and display 112, are connected to the computing device 100. The connections could include a direct, wired coupling or a local wireless protocol such as, for example, Bluetooth, Wi-Fi, a LAN, a WAN, a cellular network, a 4G LTE, a 5G LTE, a WLAN, other IEEE 802.xx networks, the Internet or the like.

The microphone 106 associated with thick client 100 may be a wired or wireless microphone. In both cases, the microphone 106 transmits data to the client device 100. The microphone 106 may be an application resident on a smartphone or the like that may include, for example, a Bluetooth or Wi-Fi connection to the client device having an installed copy of Dragon Dragon Naturally Speaking®. The application converts a smartphone to a wireless microphone that transmits audio to the local client device.

With the Internet, it wasn't long before applications were no longer necessarily running or resident on the local computing device. In the case of the above referenced exemplary dictation/transcription application, the speech-to-text data processing application, engine, or module may be resident on a remote computing device that hosts the speech-to-text data processing. Typically, the remote computing device is more computationally powerful than the local workstation or client station. This is commonly referred to as a client computing device. In such an exemplary system, the audio is received by a microphone that is operationally coupled to a client device. The client device directs, via conventional network connection protocols, to the hosted application that processes the audio to text using the speech-to-text conversion engine and returns the text to the networked client device. The client device typically has a display onto which the results of the application's processing is displayed.

Figure 2:
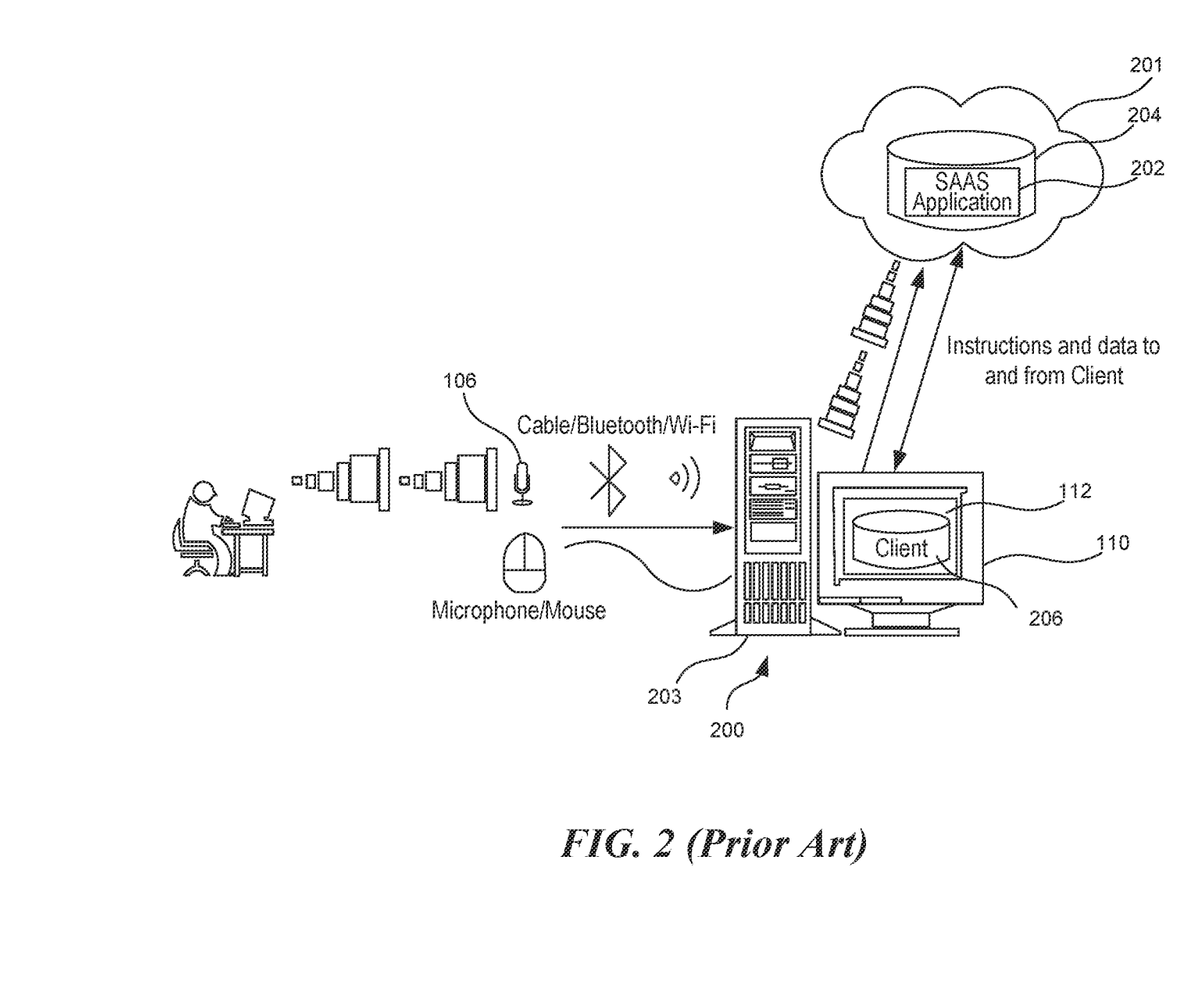
FIG. 2 is a functional block diagram of a thin client having an audio input to a local processor that transmits and receives data with a remote server and a remotely hosted application.

With reference to FIG. 2, a hosted or server application 202 is resident on a server 204 that may be remote from the client device 200 (sometimes referred to generically as client 200). The hosted application 202 and server 204 is visually depicted as in the cloud 201 as is generally understood in the art. In some applications, the architecture of FIG. 2 may be considered a thin client architecture. Thin client, in this context, means the user interacts with an application on a first computing device (client device 200 here) and a second computing device (server 204), typically remote from the first computing device performs some or a majority of the processing. Further, FIG. 2 shows the hosted application 202 as a Software as a Service application (or "SaaS"). SaaS is simply one common exemplary type of hosted application. The client device 200 receives data from an input 106, such as a microphone for audio input, similar to the above that is operatively coupled to the client device 200, which is a thin client device in this exemplary embodiment but could be a fat client device. The client device 200 typically includes the monitor 110 that may project a display on the display 112 of the monitor 110. The data returned from the server application 202 may be a text document, in the case of certain types of dictation/transcription applications, or input to a graphical user interface displayed on the display 112, a result based on data entered into the graphical user interface, or the like. As can be appreciated, the change in relationship between the components of FIGS. 1 and 2 happens with network based applications, where the network based application is private or public. In a public environment, such applications may be referred to as Software as a Service or "SaaS" as mentioned above. Generally, SaaS is split into two pieces, a heavyweight hosted application 202 running on a server 204 in a remote data center, and a light-weight client application 206 running on the client device 200 (while shown for convenience on the monitor 110) the client application 206 would be operating to cause the processor 203 of the thin client 200 to execute instructions. In our exemplary embodiment, where the hosted application 202 is a speech-to-text engine, the user speaks into the microphone 106 that is operatively connected to the client application 206 running on the client device 200. The client application 206 directs the audio to the hosted application 204 that processes the user's audio and sends instructions and data to the client application 206. Similarly to the above, the peripherals to the client device 200 may be connected to the client device 200 by cable, Bluetooth, or Wi-Fi. Distributed transcription systems are further described by, for example, U.S. Pat. No. 8,150,689, titled Distributed Dictation/Transcription System, which issued Apr. 3, 2012, and U.S. Pat. No. 8,311,822, titled Method and System of Enabling Intelligent and Lightweight Speech to Text Transcription Through Distributed Environment, which issued Nov. 13, 2012, both of which are incorporated herein as if set out in full.

Figure 3:
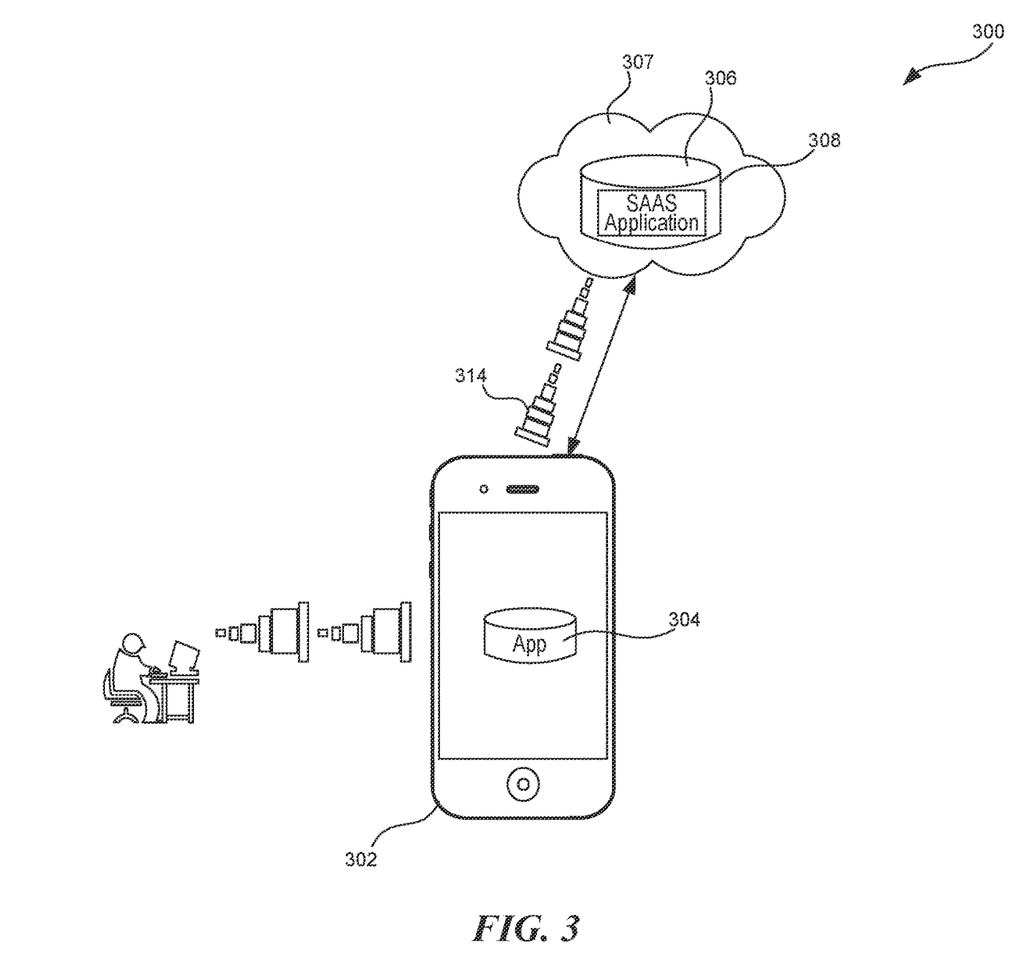
FIG. 3 is a functional block diagram of a thin client having an audio input to a local processor that transmits and receives data with a remote server and a remotely hosted application.

Many dictation applications that return text are now available for use on mobile devices. With reference to FIG. 3, the audio is received by the mobile device 302, which may be a smartphone, tablet, or the like. The audio, or other data, is received and transmitted by a client application 304 on the mobile device 302 to the hosted application 308 running on server 306 that processes the audio into text. The hosted application 308, in real-time, returns the text to the mobile device 302, via the client application 304, for entry into a form, field, document, or the like on the mobile device 302. When mobile device 302 is a mobile device, however, further interaction with the text is often difficult and cumbersome as navigating to the correct form or field, and the reduced display size of a mobile device or tablet potentially introduces inefficiencies.

Thus, against this background, it is desirable to provide systems, methods, and apparatus for real-time dictation and transcription with multiple remote endpoints.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a method to allow for real-time dictation and transcription with multiple remote endpoints is provided. The method comprises evoking a primary application, such as, for example, Mircosoft WORD® and a client device APP (or APP) to work with a remote hosted application to process audio for the primary application. The APP connects to the hosted application, and the hosted application receives and processes the audio. The hosted application returns the text to the client device, which text populates the primary application. The APP and/or the hosted application also transmits the text to a remote endpoint, sometimes referred to as a secondary client device, such as, for example, a desktop computer or a laptop computer where the user can interact with the primary application and the text returned by the hosted application.

These and other aspects of the present system and method will be apparent after consideration of the Detailed Description and Figures herein.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application will be described with reference to particular discrete processors, modules, or parts, but one of ordinary skill in the art will recognize on reading the disclosure that processors may be integrated into a single processor or server, or separated into multiple processors or servers. Moreover, the technology of the present application will be described with specific reference to a remotely hosted application such as a speech recognition data processing application, module, or engine. However, the technology described herein may be used with applications other than those specifically described herein. For example, the technology of the present application may be applicable to other types of SaaS or the like, especially where interacting with the returned data is difficult or cumbersome on a mobile device.

Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

For reference, the technology of the present application provides a client device that comprises a mobile computing device such as, for example, a smartphone or tablet device. The client device generally is a thin client device having an APP that provides an interface where the APP transmits, and in some instances receives, data, such as audio or text, to and from a hosted application that processes the data, such as, for example, the aforementioned speech recognition engine, module, or the like. The technology also provides an input device such as a wireless microphone where the wireless microphone may be the microphone in a conventional smartphone or tablet. The wireless microphone may be referred to as the wireless microphone, mobile device, or smartphone. The technology also provides for other input devices or emulators such as virtual keyboards, mice, pens and other sensors, which may also be associated with applications running on a client device. Without loss of generality, the description of the technology will use the microphone as the exemplar input device. The client device will typically be running the APP to allow the client device to interact with the remotely hosted application or applications when internet, and in some instances cellular, connectivity is available. The remotely hosted application is hosted on a server that is typically, but not necessarily, remote from the client device. The remotely hosted application also interacts with a client application operating on the client device. The remotely hosted application may be referred to as a "hosted application" or a "SaaS" application.

With reference back to FIG. 3, the technology of the present application will now be explained in detail with reference to system 300. System 300 shows overall operation of the technology of the present application. System 300 includes a mobile device 302, which in this case is shown as a smartphone but could be any mobile device 302 configured to have a network or cellular connection to a hosted application 308. The mobile device 302 includes an APP 304 to allow the mobile device 302 to receive data from a client (a.k.a. user) of the mobile device 302, such as audio data. The system 300 also includes a server 306 hosting the hosted application 308, generally referred to as the SaaS Application 308. The server 306 and hosted application 308 may be considered to be in a cloud 307. The server 306 includes a processor and a memory where the memory comprises instructions, such as the hosted application 308, that the processor can execute. In this exemplary embodiment, the APP 304 executing on the mobile device 302 receives audio from the client and, in the normal course, facilitates the transfer of the audio from the mobile device 302 to the server 306 for use by the hosted application 308. The server 306 processes the instructions associated with hosted application 308 to process data or commands received from the APP 304. In this exemplary embodiment, the hosted application 308 in conjunction with the server 306 processor and memory would convert the audio from the client into a data string representative of the text. The hosted application 308 and server 306, in the normal course, return the processed data or commands to the APP 304. The mobile device 302 has a memory and a processor as well where the memory comprises instructions, such as the APP 304, which the processor can execute. The APP 304 would execute the processed data or commands to, for example, show a text document, populating a text field, etc. using the data string returned from the server 306.

The mobile device 302 is coupled to the server 306 and the hosted application 308 through a first communication link 314. The first communication link 314 may be via the cellular connectivity to the hosted application 308, which first communication link 314 may include a cellular tower, a media gateway, or the like, and a network connection to the hosted application where the network connection is the Internet, although a private network could be used as well. The first communication link 314 also may be via a wireless connection to the network, which first communication link 314 may include a Wi-Fi router or similar other wireless connections to the internet.

Of course, FIG. 3 shows a single mobile device 302 coupled to the server 306 and the hosted application 308. It is envisioned that a plurality of client devices 302 will be connected to the hosted application 308 (or several instances of the hosted application 308). Thus, the various components typically register the mobile device 302 (or the APP 304) with the hosted application 308 such that the audio from the mobile device 302 is operatively coupled to a client account.

Figure 4:
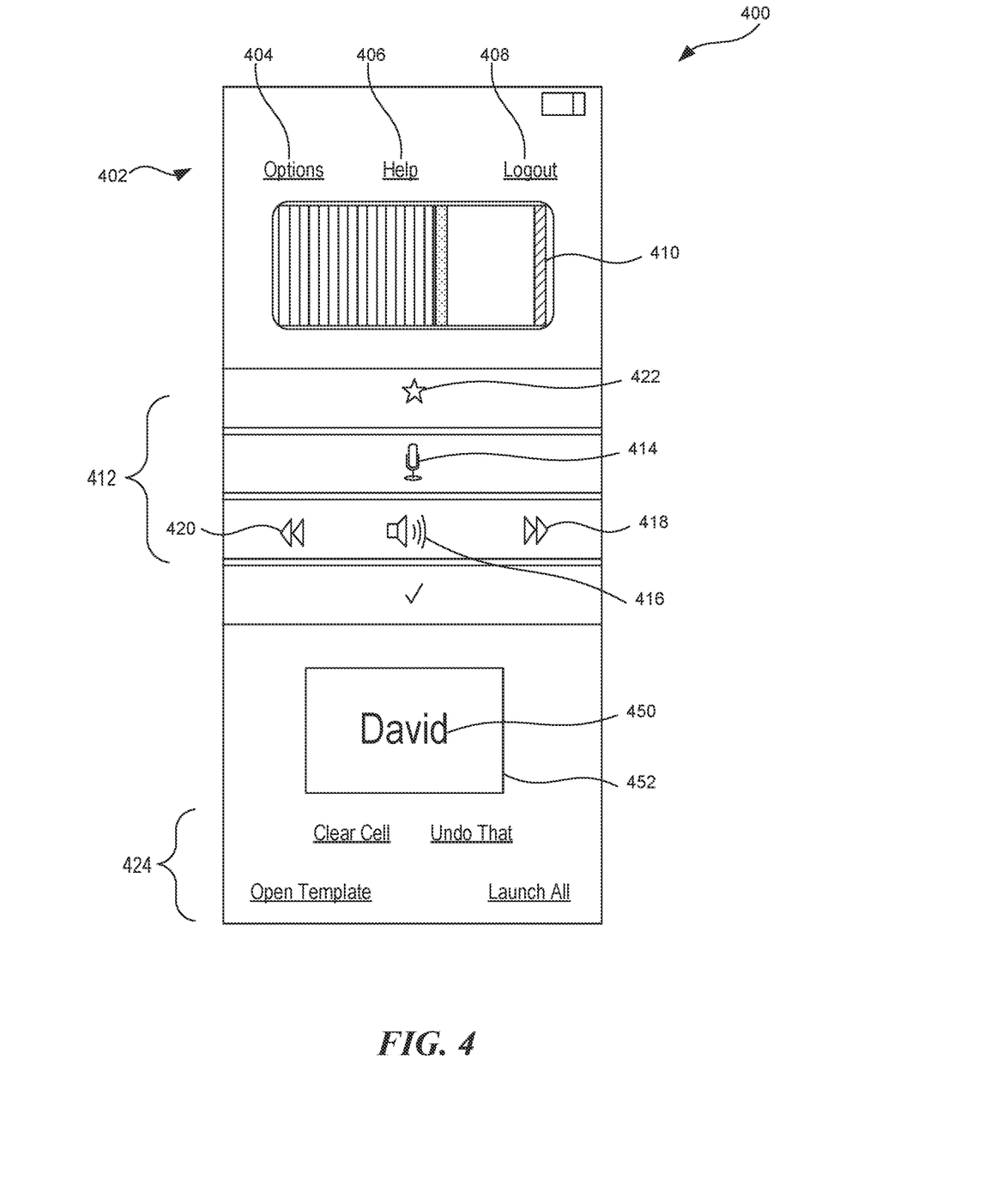
FIG. 4 a graphical user interface of a wireless microphone application consistent with the technology of the present application.

Generally, the APP 304 is downloaded and installed on the mobile device 302, which may be for example, a smartphone. The APP 304 may launch and provide a graphical user interface (GUI) 400 as shown in FIG. 4. In certain embodiments, the GUI 400 may be associated with an enterprise productivity or office automation application. The GUI 400 also may show the processed data returned from the hosted application 308 in certain embodiments. While not specifically shown, in certain embodiments, the GUI 400 may include a display for the results of the processed data, such as text 450 in text field 452. In this exemplary GUI 400, a menu bar 402 may be provided, as shown the menu bar 402 is provided at the top of the GUI 400 as is conventional with smartphone app features. The menu bar 402 may include items, such as an options tab 404, a getting help tab 406, and a logging in/out tab 408, which allows the user to provide the necessary credentials to the hosted application 308 on the server 306. For reference, tabs and buttons are generally used interchangeably herein. The hosted application 308 uses the credentials that have been separately submitted from the APP 304 to associate the APP 304 and the mobile device 302 with a client account. Other functions illustrated here are an audiometer 410 that tells the user how quietly/loudly he is speaking. The audiometer 410 is shown as a bar graph that fills as the volume of the speaker increases or decreases, but the audiometer 410 could be replaced with a numerical indication, such as a percentage or a decibel number. In other embodiments, the audiometer 410 may simply a word or phrases, such as "too quiet", "too loud", or "volume ok", or the like.

Text field 452 and text 450 are shown in a rather large space in the GUI 400. Often, as can be appreciated with mobile devices, the text field 452 is small and difficult to navigate too, especially when the GUI 400 includes numerous such fields although only one (1) is shown here. Also, the text 450 is frequently small and difficult to read and edit on a mobile device.

The GUI 400 also may include a collection of buttons 412 for handling data capture, such as voice capture for audio processing, and review. The buttons may include a record button 414, such as the microphone button shown, a listen button 416, such as the speaker button shown, a forward button 418 and a rewind button 420 (or reverse/backwards button). The forward and rewind buttons may have fast versions and skips or the like. To facilitate forward and rewind, the audio transmitted from the wireless microphone may be tagged and the subsequent text transmitted to the client device may be similarly tagged such that, for example, a rewind command can be coordinated with text transmitted to the client device. In this exemplary embodiment, the GUI 400 also provides a shortcut button 422, as shown by the star button. The shortcut button 422 may bring up a menu with other options or provide for voice activation or commands. Additional buttons 424 may be provided to which different commands/actions can be assigned.

Figure 5:
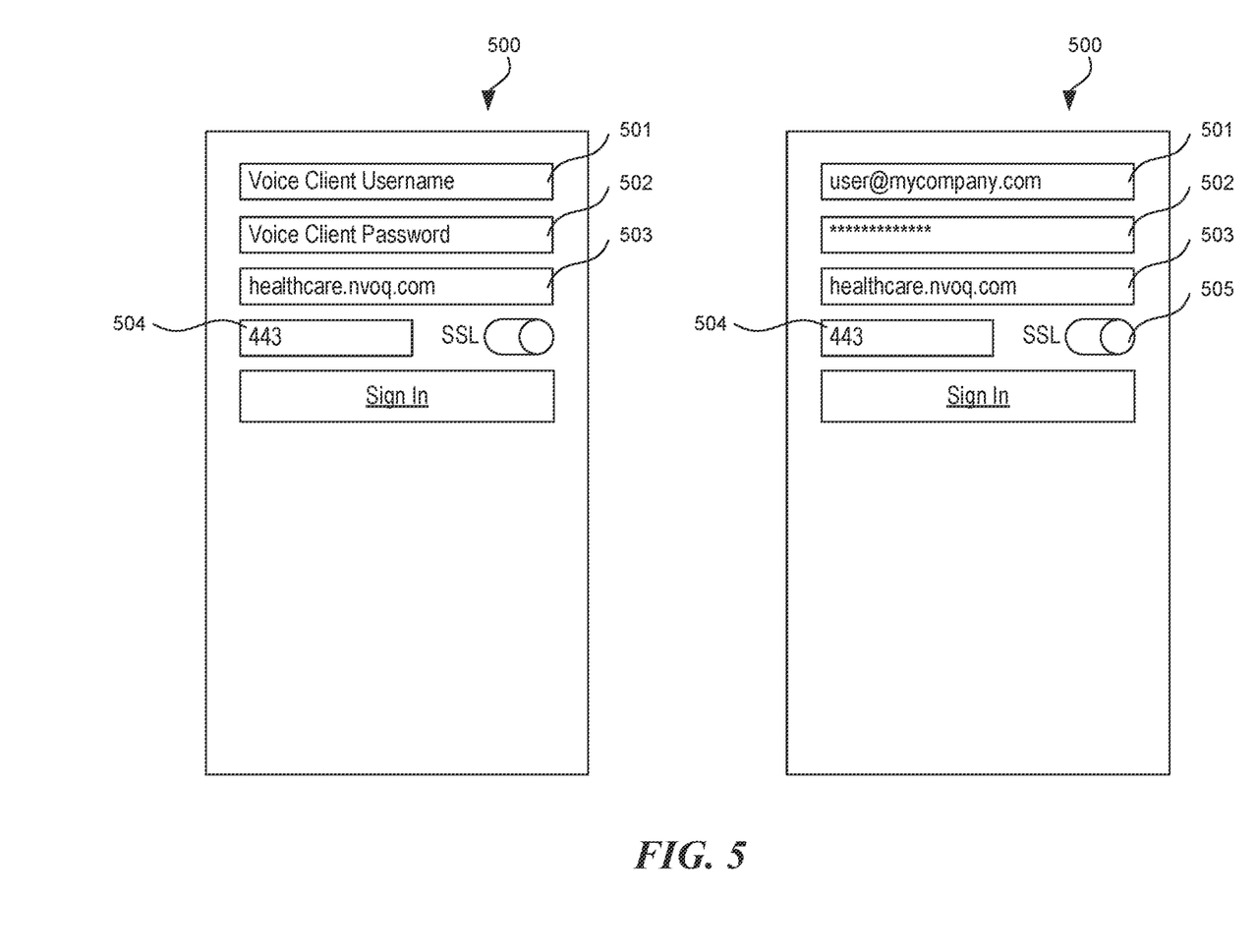
FIG. 5 a graphical user interface of the wireless microphone of FIG. 4 showing an exemplary login consistent with the technology of the present application.

With refer to FIG. 5, the GUI 400 is shown when the logging in/out tab 408 has been selected. The log in graphical user interface 500 allows the APP 304 to gather the necessary information to associate the session on the mobile device 302 with the user or client account of the hosted application 308 on the server 306. In this exemplary case, the APP 304 gathers the user's credentials (User ID 501 and Password 502) as well as the IP address 503 (and port 504) of the hosted application 308, which in this exemplary embodiment is a speech to text workflow application such as, for example, the SayIt™ application available from nVoq Incorporated, of Boulder Colo. This example also allows the user to specify that an encrypted connection be used (the "SSL" option on/off button 505).

Figure 6:
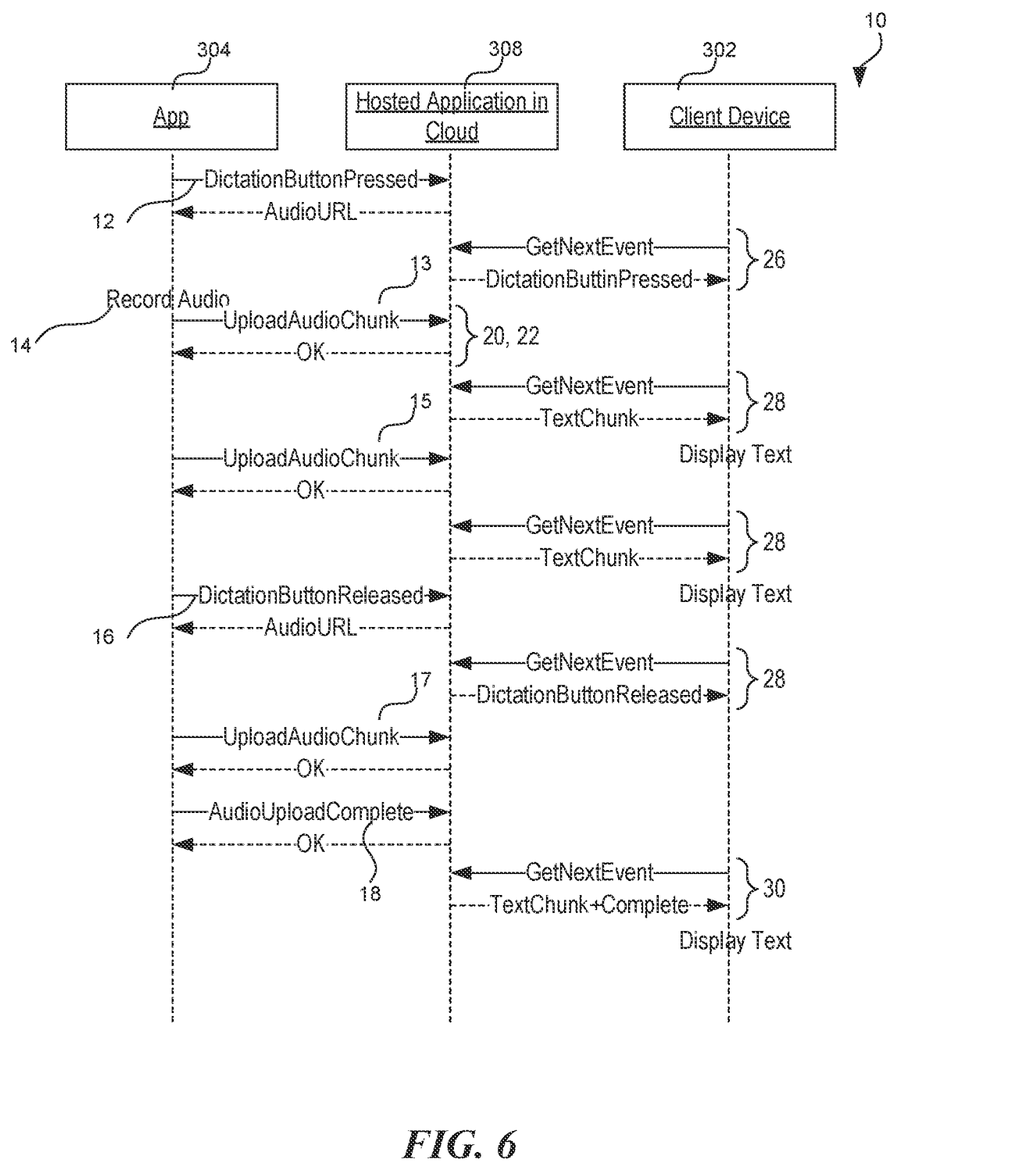
FIG. 6 is a flow/sequence diagram for transmitting audio and data over the cloud based configuration of FIG. 3 consistent with the technology of the present application.

A flowchart 10 is provided in FIG. 6 showing one exemplary methodology for the process flow of audio, where the user of the mobile device 302 dictates to the APP 304 and the transcribed text, which the server 306 hosting the application 308 generates from the dictation, is received by the APP 304 and displayed on the mobile device 302. The process starts after the above associations. The uploads from the APP 304 and the downloads to the mobile device 302 described herein can occur at different times, but they are explained together herein generally occurring as the data is streamed from one device to the next, e.g., generally real time. First, the dictation function of the APP 304 is initiated by, for example, pressing (and holding in some embodiments) a dictation button, such as the record button 414, step 12. The user begins speaking into the mobile device 302 to record the dictation, step 14. When the dictation is complete, the user may release the record button 414, step 16. Notice, in certain embodiments instead of pressing and holding the record button 414, the record button may initiate on a first press and release (or tap) and terminate on a second press and release (or tap). The APP 304 notifies the hosted application 308 that it has finished a recording session, step 18.

While the user is recording audio, the APP 304 periodically uploads audio to the hosted application 308, step 13 and 15, shown as being uploaded during the recording and step 17 showing final audio being uploaded subsequent to the termination of the recording. There is no requirement that the final audio upload occurs subsequent to the stoppage of the recording as the APP 304 may automatically expunge silence at the end of a recording. Rather than uploading chunks, audio may be streamed in certain embodiments or batch uploaded in a single batch in still other embodiments.

The hosted application 308 at the server 306 begins receiving the audio, step 20, and transcribes the received audio, step 22. The transcribed audio is queued as corresponding chunks of text, step 24. The hosted application 308 periodically returns text to mobile device 302 to be displayed or inserted into the appropriate text/data field, be it an editable field in a GUI, a spreadsheet, a text document, or the like. Moreover, the hosted application 308 monitors the transmission for an indication of the next event, step 26, which in this exemplary embodiment is the next chunk of transcribed text. The new text chunks are transmitted (either pushed or pulled) from the hosted application 308 to the mobile device 302, step 28. In certain embodiments, the transcribed text may be streamed. The client 302 uses the text as required by the client application for which the APP 304 is receiving audio, such as, for example, displaying the transcribed text. When the transcribed text is all transmitted, the hosted application may notify the mobile device 302 that the transcription is complete, step 30, which may be used as a check against the completion of the audio signal from the APP 304.

Figure 7:
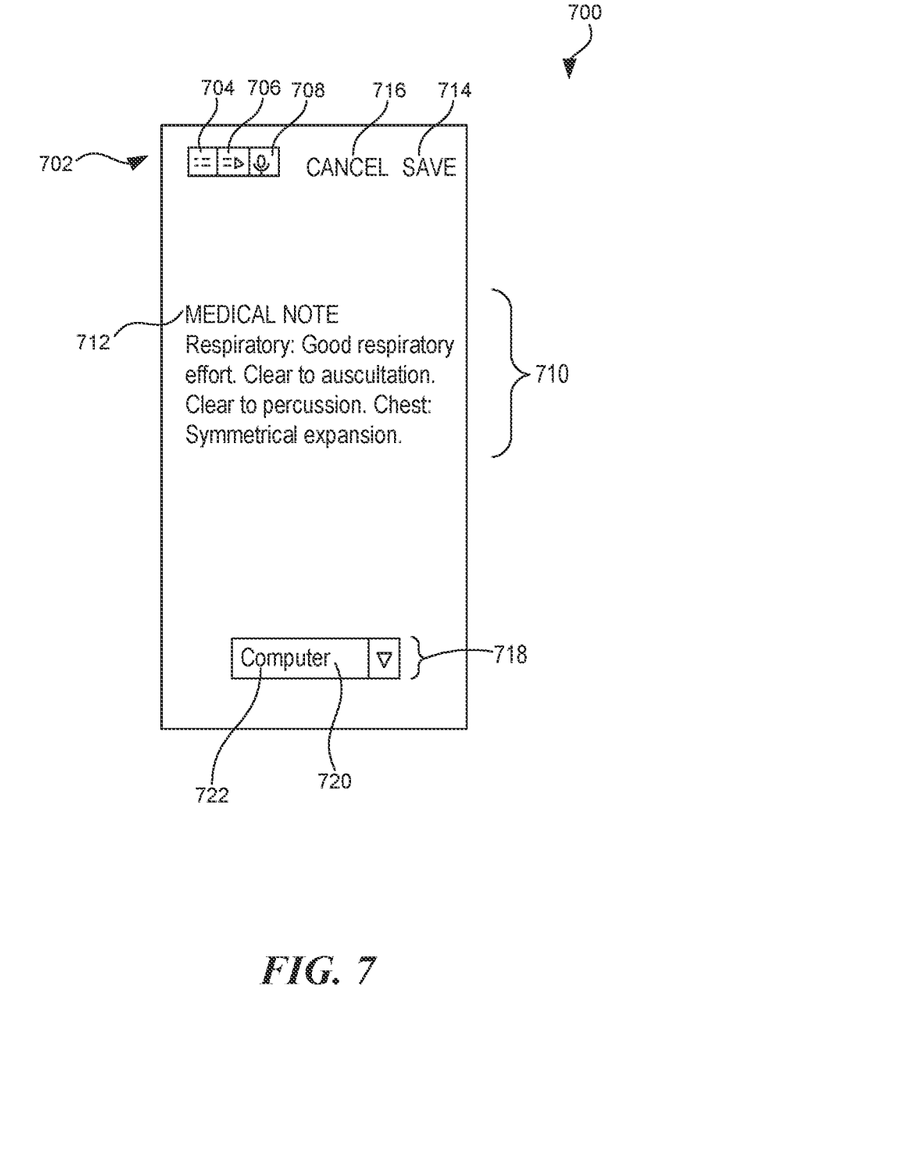
FIG. 7 a graphical user interface directing text from a mobile device to a remote endpoint consistent with the technology of the present application.

Consistent with the technology, FIG. 7 provides a graphical user interface for a mobile device 700 consistent with the technology of the present application. The mobile device 700, which may be used interchangeably with the mobile device 302, may include a number of different types of devices such as, for example, a smartphone, a cellular phone, a tablet computer, a laptop or portable computer, gaming devices, or other devices connectable to a network. The mobile device 700 has a display 701 with a surface area SA that often, but not always, is similar in size to the surface area of the major surface of the mobile device 700. The mobile device 700, as described above, includes processors, receives and transmitters (or transceivers), and memory such that the mobile device can process instructions and transmit/receive data. In certain instances, the mobile device may couple wirelessly to a network or wired to a network, such as through a USB port. In this exemplary embodiment, the GUI includes a menu bar 702 that includes buttons to control the application, such as application 304 discussed above. the buttons include, among other things, in this exemplary embodiment, a stop button 704, a play button 706, and a record button 708. As explained above with the flowchart, the mobile device 700 may include a built-in microphone to receive audio. The audio would be recorded by the mobile device and APP 304 would operate to transmit the audio, for example, to the hosted application 306. The APP 304 also would receive the return text, which may be tagged to be tracked with the audio, and display the text in, for example, display box 710. In the exemplary embodiment, the mobile device 700 is used by a health care provider to make a medical note 712 that may be stored in an electronic health record. The returned text in the medical note, in this case, may read: "Respiratory: Good respiratory effort. Clear to auscultation. Clear to percussion. Chest symmetrical expansion." As can be appreciated, the display box 710 is a smaller portion of an already small display 701 on a mobile device 700. The technology of the present application, as will be described below, provides an option bar 718, such as a drop-down menu as shown, with a remote endpoint field 720 containing options for one or more remote endpoints 722, such as a designated computer. The data in the display box 710 may be transmitted by the mobile device 700, as explained further below, to a remote endpoint 722, such as, for example, a desktop computer 100 or 200 shown in FIGS. 1 and 2. Typically, the monitor, such as monitor 110 will have a display surface area SA' larger than the surface area SA of the mobile device display 701.

Figure 8:
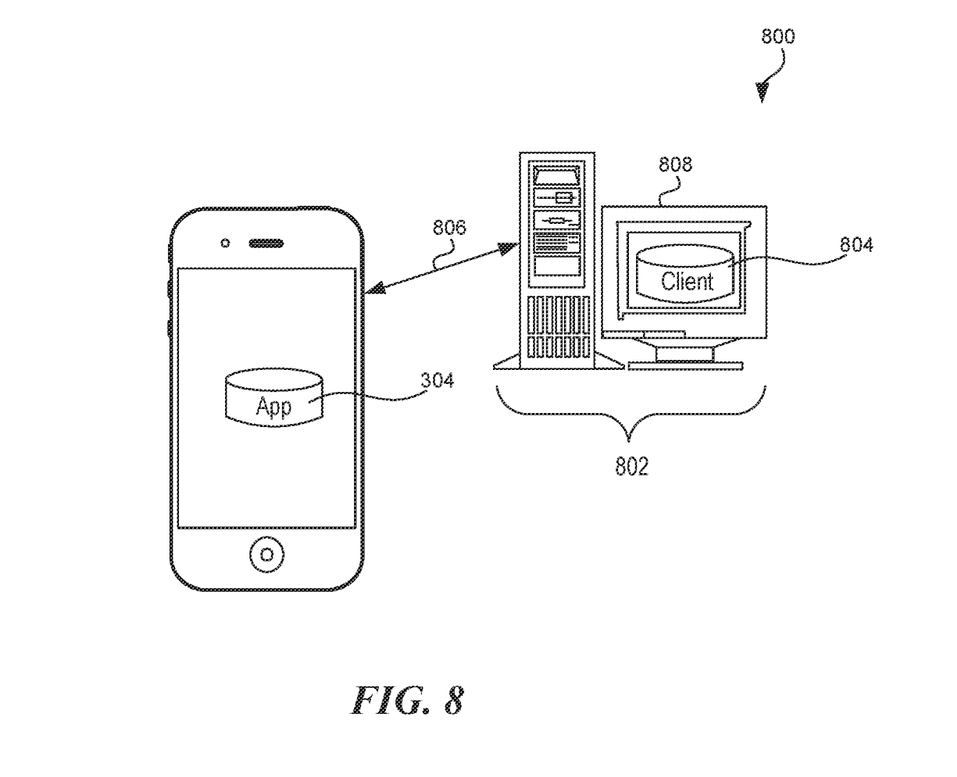
FIG. 8 is a functional schematic diagram of a system to direct text from the mobile device to the remote endpoint consistent with the technology of the present application.

As shown in FIG. 8, the mobile device 700, running for example, the APP 304 may be linked to a remote endpoint 722, such as the desktop computer 800, via a local communication link 806. The computer 802 would be running a client APP 804 that communicates with APP 304 over the data network to display the data in display box 710. The communication link 806 in this exemplary embodiment may be, for example, a direct cable connection, a USB cable connection, a Bluetooth connection, a near field radio frequency connection, a wifi connection, a local area network, or the like.

The APP 304 operating on the mobile device 700 and the client APP 804 operating on the remote endpoint 722, such as the computer 800, allow for real time symbolization between the data displayed in the display box 710. For example, the text returned from the audio on APP 304 may have displayed "Respiratory: Good respiratory effort. Clear to auscultation. Clear to percussion. Chest symmetrical expansion." The health care provider may notice, on review of the text, that the entry "Chest symmetrical expansion" should have been "Chest unsymmetrical expansion". The health care provider could enter the change using, for example computer 802 to update the text in the display on monitor 808. The client APP 804 would transmit the change over the communication link 806 to APP 304, which would update the display box text. Similarly, changes made using the mobile device 700 would be transmitted over the communication link 806 such that the client APP 804 could update the data displayed on display 808. However, as outlined above, it is envisioned that most changes and reviews of the data would occur on the remote endpoint as the data is more easily viewed and manipulated.

Figure 9:
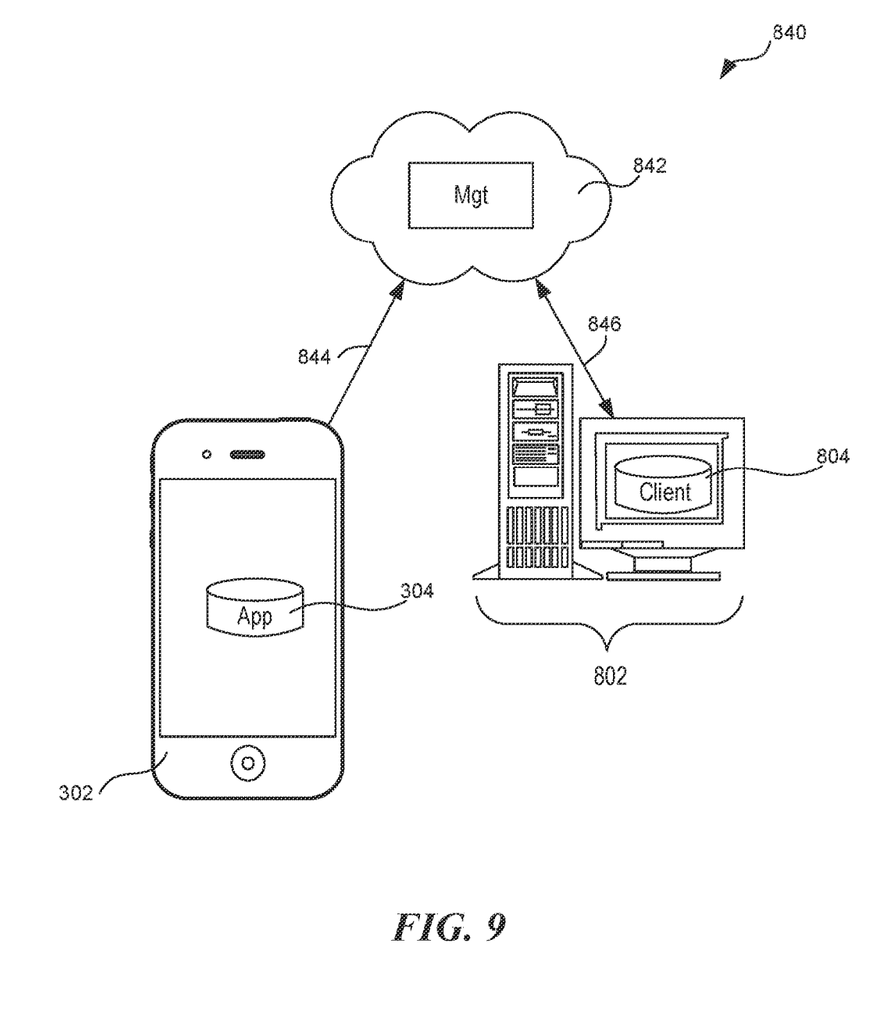
FIG. 9 is a functional schematic diagram of a system to direct text from the mobile device to the remote endpoint consistent with the technology of the present application

In certain instances, the mobile device executing APP 304 and the remote endpoint 722, such as the computer 802 may not have a direct communication link such as communication link 806 described above. FIG. 9 shows a scenario where a remote management application 842 may function to connect the mobile device 302 as shown in FIG. 9 and the remote endpoint 822, which is the computer 802 in FIG. 9. The management application 842 may be a hosted application separate from the hosted application 308 or the functionality of the management application 842 may be incorporated into the hosted application 308 described above.

Management application 842 transmits and receives data with APP 304 over a first communication link 844. Similarly, management application transmits and receives data with client APP 804 over a second communication link 846. Generally, the first and second communication links 844 and 846 can be the same or different. It is envisioned that the communication links 844 and 846 will be network connections to public networks, such as the Internet, or the like, but other communication links are possible.

Referring back to FIG. 5, the login interface allows the APP 304 to gather the necessary information to associate the session on the mobile device 302 with the user of the hosted application 308. In this exemplary case, as explained, the APP gather the user's credentials (such as a User ID and Password) as well as the IP address and port of the hosted application 308. The client APP 804 may have a similar login interface as shown in FIGS. 4 and 5 for the mobile device. In this procedure, the hosted application, in this case, the management application 842, can capture the necessary information and associate the mobile device and the remote endpoint (which is a computer in this exemplary embodiment).

Figure 10:
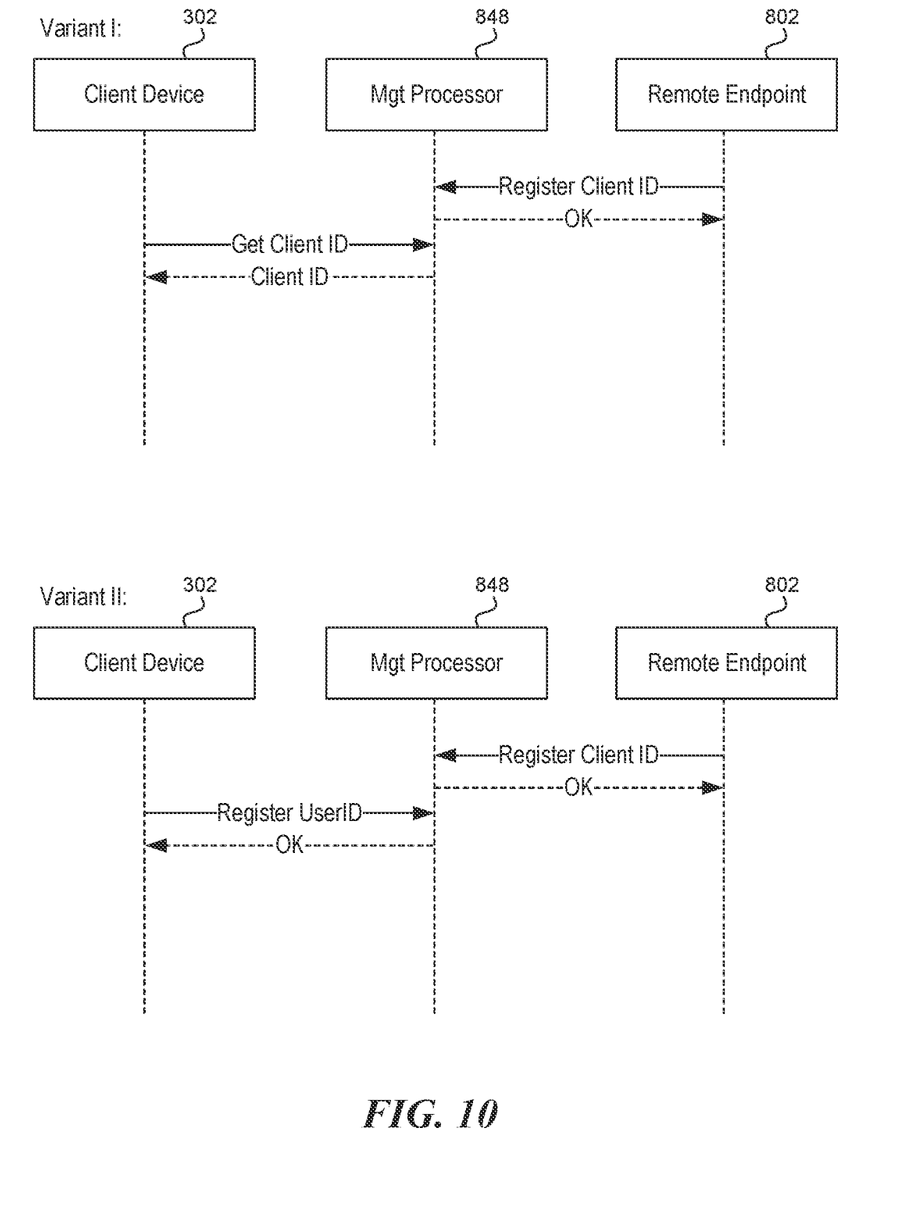
FIG. 10 is a flow/sequence diagram for registering the cloud based computer operating configuration consistent with the technology of the present application.

With the appropriate information, as explained above, it is possible to connect the APP 304 on the mobile device 302 and the client APP 804 on the remote endpoint 722 (which is computer 802 in this example) through the management application 848, which may be incorporated into the hosted application 308 on the server 306. In other words, for purposes of the described technology, the mobile device 302 does not send data directly to the remote endpoint 722. For purposes of the technology of the present application, in one aspect, the mobile device 302 is not being directly connected (or not transmitting data directly) to the client device means an intermediate processor, which in this case in the server, routes the data from one device to the other. Additionally, the intermediate processor processes the data to provide a result or command to the remote endpoint. In this case, the result would be the data displayed in the display box. Notice, in certain embodiments, the hosted application 308 (in combination with the management application 848) may convert the audio to text and transmit the text to both the mobile device 700 and the remote endpoint 722 substantially simultaneously. The remote endpoint, generally, however, will receive the data secondarily from the mobile device 700 based on the selection in the drop-down menu 720. With reference to FIG. 10, the APP 304 on the mobile device 302 and the client application 804 on the endpoint 722 (or computer 802 in this example) register their presence with the management application 848 in the cloud (which could be any of a plurality of servers 306 hosting management application 848). If not incorporated into the hosted application 308, the management application 848 may reside on separate servers. The registrations provide sufficient information for the management application 848 to ascertain that the same (or at least an authorized) user is associated both with the APP 304 and the client application 804. There are various methods for the registration. In the first variant, the client application 804 on the remote endpoint 802 registers with the management application 848 and the APP 304 polls the management application 848 for the client application's ID, which it uses when submitting transcription, shortcut, or command requests (which command requests will be explained below). In the second variant, both the client application 804 and the APP 304 register themselves with the management application 848, and the management application 848 makes the association between the APP 304 and the client application 804 so that the results of handling transmitted data from the APP 304 are sent to the appropriate client application 804 on the remote endpoint. The mobile device and the client device are fungible such that, for example, a user could access any smartphone with the APP 304 and log into the system and similarly, the user could establish a session with any remote endpoint that has the client application 804.

Similar to the direct communication link 806 in FIG. 8, once the APP 304 and the client application 804 are linked via the management application, the APP 304 and the client application 804 can be synchronized such that a change in the data at mobile device 302 (or 700) is transmitted to the remote endpoint 722 (such as the computer 802) to update the display and visa versa.

In some embodiments, the mobile device 700 may have a remote endpoint 722 selected in the GUI menu 720 prior to receiving the audio in the first instance. In this exemplary embodiment, the APP 304 may transmit the audio to the hosted application 308 for conversion to text. The audio transmission may include, in this instance, appended data or meta data that alerts the hosted application 308 to the remote endpoint 722 selection, such as computer 802. The hosted application 308 may transmit the appended data or meta data indicative of the remote endpoint 722 to the management application 848 (whether incorporated into the hosted application 308 or separate). In this instance, the hosted application 308 may transmit the text generated from the audio directly to both the mobile device 700 and the remote endpoint 722. In other embodiments, the mobile device may be able to select in menu 720 a choice for the remote endpoint 722 only to receive the data from the hosted application 308. In this exemplary embodiment, the audio received at the mobile device 700 would be uploaded along with the selection of remote endpoint 722 only choice. The hosted application 308 (with an integrated management application 848 or in conjunction with a separate management application 848) would convert the audio to text and transmit the text only to the remote endpoint 722, which may be computer 802 as described above.

Figure 11:
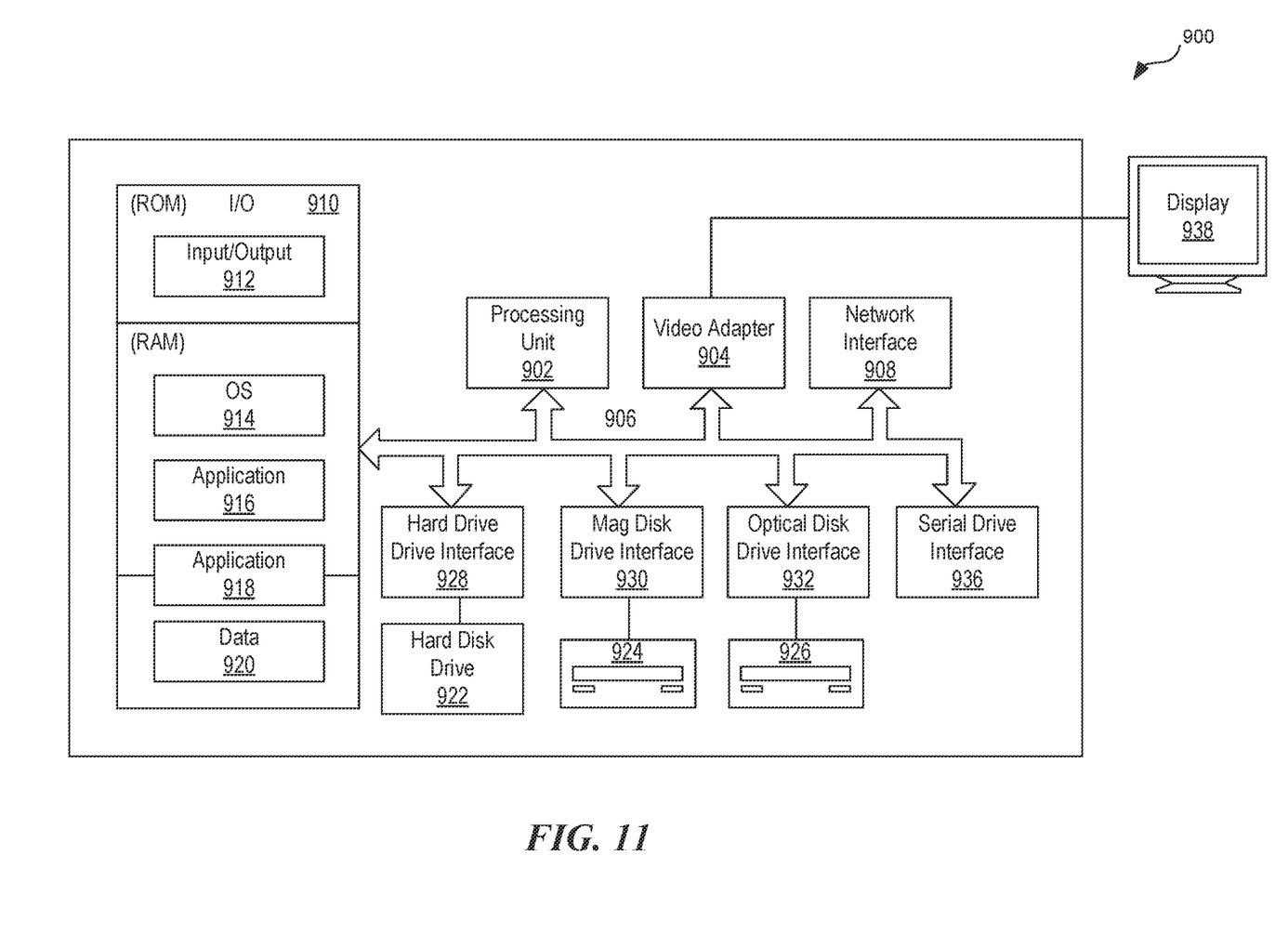
FIG. 11 is a functional block diagram of a device on which the technology of the present application may be implemented.

Referring now to FIG. 11 a functional block diagram of a typical machine capable of incorporating the technical solutions of the present application. The machine may be the mobile device, thin or thick client, server or the like. The client device 900 for the technology of the present application is provided. Client device 900 is shown as a single, contained unit, such as, for example, a desktop, laptop, handheld, or mobile processor, but client device 900 may comprise portions that are remote and connectable via network connection such as via a LAN, a WAN, a WLAN, a Wi-Fi Network, Internet, or the like. The client device 900 could be associated with the mobile device 302, the server 306, or other devices. Generally, client device 900 includes a processor 902, a system memory 904, and a system bus 906. System bus 906 couples the various system components and allows data and control signals to be exchanged between the components. System bus 906 could operate on any number of conventional bus protocols. System memory 904 generally comprises both a random access memory (RAM) 908 and a read only memory (ROM) 910. ROM 910 generally stores a basic operating information system such as a basic input/output system (BIOS) 912. RAM 908 often contains the basic operating system (OS) 914, application software 916 and 918, and data 920. System memory 904 contains the code for executing the functions and processing the data as described herein to allow the present technology of the present application to function as described. Client device 900 generally includes one or more of a hard disk drive 922 (which also includes flash drives, solid state drives, and etc. as well as other volatile and non-volatile memory configurations), a magnetic disk drive 924, or an optical disk drive 926. The drives also may include zip drives and other portable devices with memory capability. The drives are connected to the bus 906 via a hard disk drive interface 928, a magnetic disk drive interface 930 and an optical disk drive interface 932, etc. Application modules and data may be stored on a disk, such as, for example, a hard disk installed in the hard disk drive (not shown). Client device 900 has network connection 934 to connect to a local area network (LAN), a wireless network, an Ethernet, the Internet, or the like, as well as one or more serial port interfaces 936 to connect to peripherals, such as a mouse, keyboard, modem, or printer. Client device 900 also may have USB ports or wireless components, not shown. Client device 900 typically has a display or monitor 938 connected to bus 906 through an appropriate interface, such as a video adapter 940. Monitor 938 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology. The speech recognition engines may have similar constructions.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

I claim:

1. A method for a mobile device to send text generated by a speech to text application to a remote endpoint device, comprising:
receiving, via an application executing on a mobile device, the text generated from the speech to text application;
populating, via the application executing on the mobile device, a text field with the text generated from the speech to text application;
receiving, via the application executing on the mobile device, a selection of a remote endpoint device to receive the text from the mobile device,
wherein the selected remote endpoint device is executing the speech to text application; and
transmitting, by the mobile device, the text to the remote endpoint device such that the remote endpoint device can display the text on the display of the remote endpoint device.

2. The method of claim 1 wherein the text field is a text editable field in a graphical user interface.

3. The method of claim 1 wherein the text field is a word processor document.

4. The method of claim 1 wherein the selected remote endpoint device is a desktop computer.

5. The method of claim 1 wherein the selected remote endpoint device is a laptop computer.

6. The method of claim 1 wherein the selected remote endpoint device is a second mobile device wherein the second mobile device has a second mobile device display larger than a display of the mobile device.

7. The method of claim 1 wherein the mobile device is coupled to the remote endpoint device via a cable.

8. The method of claim 1 wherein the mobile device is connected to the remote endpoint device via a Bluetooth communication link.

9. The method of claim 1 wherein the mobile device is connected to the remote endpoint device via a network communication link.

10. The method of claim 1 wherein the mobile device is connected to the remote endpoint device by registering the remote endpoint device with a management processor.

11. The method of claim 10 wherein the mobile device is registered with the management processor wherein the management processor associates the remote endpoint device and the mobile device by a user identification.

12. The method of claim 1 comprising receiving at the mobile device edits to the text from the remote endpoint device and synchronizing the text at the mobile device with the edits from the remote endpoint device.

13. The method of claim 1 comprising editing at the mobile device the text and transmitting the edits to the remote endpoint device to synchronize the text at the remote endpoint device.

14. A display system comprising:
a mobile device, the mobile device having an application to receive text generated from a speech to text application and display the text received from the speech to text hosted application in a display box on the mobile device,
wherein the application populates, on the mobile device, a text field with the text generated from the speech to text application;
at least one remote endpoint device operatively coupled via at least one communication link to the mobile device,
wherein the mobile device is configured such that the at least one remote endpoint device is selectable by a user of the mobile device,
wherein the mobile device transmits the text to the at least one remote endpoint device,
wherein the text in the display box on the mobile device is displayed on a monitor of the at least one remote endpoint device,
wherein the selected at least one remote endpoint device is executing the speech to text application.

15. The display system of claim 14 wherein the at least one remote endpoint device is a plurality of endpoints.

16. The display system of claim 14 wherein the at least one remote endpoint device is operatively coupled to the mobile device by a direct communication link.

17. The display system of claim 14 wherein the mobile device is operatively coupled to a management application in a server coupled to the mobile device via a network and the at least one remote endpoint device is operatively coupled to the management application in the server via the network.

18. A non-transitory computer-readable storage medium including a set of instructions that, when executed by one or more processors, causes the one or more processors to perform operations comprising:
receiving, via an application executing on a mobile device, text generated from a speech to text application;
populating, via the application executing on the mobile device, a text field with the text generated from the speech to text application;
receiving, via the application executing on the mobile device, a selection of a remote endpoint device to receive the text from the mobile device,
wherein the selected remote endpoint device is executing the speech to text application; and
transmitting, by the mobile device, the text to the remote endpoint device such that the remote endpoint device can display the text on the display of the remote endpoint device.

19. The non-transitory computer-readable storage medium of claim 18, wherein the text field is a text editable field in a graphical user interface.

20. The non-transitory computer-readable storage medium of claim 18, wherein the text field is a word processor document.

* * * * *